(12) United States Patent
Schwarz et al.

(10) Patent No.: US 6,508,325 B1
(45) Date of Patent: Jan. 21, 2003

(54) MOUNTING FOR PROXIMITY RADAR

(76) Inventors: Paul M. Schwarz, 6 Lancaster Avenue, Colonel Light Gardens, South Australia 5041 (AU); Richard Graham Teal, 10 Idsworth Road, Waterlooville, Hampshire PO8 8BD (GB); Robert John Evans, 4 Monterey Drive, Havant, Hampshire PO9 5TQ (GB)

( * ) Notice: Subject to any disclaimer, the term of this patent is extended or adjusted under 35 U.S.C. 154(b) by 0 days.

(21) Appl. No.: 09/531,290

(22) Filed: Mar. 20, 2000

(30) Foreign Application Priority Data

Feb. 28, 2000 (GB) ............................................. 0005312

(51) Int. Cl.[7] .............................................. B60R 11/00
(52) U.S. Cl. ............................. 180/167; 280/762; 293/4
(58) Field of Search .............................. 180/167, 169; 280/762; 293/4, 118, 155, 142, 145, 152, 153; 340/435, 436, 903

(56) References Cited

U.S. PATENT DOCUMENTS

| | | | | |
|---|---|---|---|---|
| 1,792,157 A | * | 2/1931 | Franke | 293/137 |
| 3,794,997 A | * | 2/1974 | Iwatsuki et al. | 342/72 |
| 4,903,004 A | * | 2/1990 | Starke et al. | 340/425.5 |
| RE34,773 E | * | 11/1994 | Dombrowski | 340/904 |
| 5,646,613 A | * | 7/1997 | Cho | 340/903 |
| 5,754,123 A | * | 5/1998 | Nashif et al. | 340/903 |
| 5,980,048 A | * | 11/1999 | Rannells, Jr. et al. | 359/843 |

* cited by examiner

*Primary Examiner*—Paul N. Dickson
*Assistant Examiner*—David R. Dunn
(74) *Attorney, Agent, or Firm*—Warn, Burgess & Hoffmann, P.C.

(57) ABSTRACT

A sensor carrier assembly for supporting one or a plurality of sensors to facilitate mounting the plurality of sensors to the vehicle. The sensors are mounted to a carrier or mounting beam which is then in turn mounted directly to the vehicle. The mounting beam mounts directly to the vehicle and a bumper covers the mounting beam. Alternatively, the sensor mounts externally to a vehicle body part, such as a bumper. Fastening points for attaching the carrier assembly to the vehicle are preferably placed in proximity to the sensors to assist in maintaining proper orientation of the sensors.

14 Claims, 8 Drawing Sheets

MOUNTING FOR PROXIMITY RADAR

CROSS REFERENCE TO RELATED APPLICATIONS

This application claims the benefit of priority of United Kingdom application Ser. No. 0005312.4, filed on Feb. 28, 2000, the entire contents of which are hereby expressly incorporated into the present invention.

BACKGROUND

The present invention relates generally to a vehicle radar system and, more particularly, to a carrier for one or a number of radar sensors for installation on a vehicle by attaching the carrier to the vehicle.

The increasing use of sophisticated electronics has provided for numerous technological advancements on vehicles. One such technological advancement is collision avoidance systems that inform drivers of objects in possible collision zones, such as the rear, sides, and the front of a vehicle. Collision avoidance systems are particularly applicable for enhancing the driver's view of rearward and sideward portions of the vehicle, particularly when moving in a reverse direction.

The installation of a collision avoidance system on a vehicle generally requires the placement of radar, infrared, or other object detection sensors at particular locations on the vehicle depending upon the particular purpose of the collision avoidance system. Many collision avoidance systems require the installation of one or a number of sensors to fully analyze a particular area around a vehicle. During the assembly process, the installation of such sensors and wiring interconnecting the sensors can be a timely and costly process.

Existing production methods typically require a single operator to sequentially install the sensors. This production method can often be very time consuming. Alternatively, a number of operators can each individually install a particular sensor. While this reduces the overall time for installing the group of sensors, this production method requires a greater number of operators and consequently increases the cost.

Thus, there is a need for a sensor mounting system for a vehicle which facilitates installation of a plurality of sensors to the vehicle, thereby reducing the time and costs for assembling the vehicle.

SUMMARY OF THE INVENTION

The present invention is directed to a sensor assembly for a vehicle including a plurality of sensors for operation of a radar system. Each sensor includes either or both of a transmitter for generating a radar signal and a receiver for detecting the radar signal upon reflection from an object. The sensor assembly also includes a carrier having an elongate shape and formed in sections. Each section interconnects by a hinge and each of the plurality of sensors mounts to the carrier. The carrier is mounted to the vehicle to orient the sensors in a predetermined position on the vehicle.

For a more complete understanding of the invention, its objects and advantages, reference should be made to the following specification and to the accompanying drawings.

BRIEF DESCRIPTION OF THE DRAWINGS

The drawings, which form an integral part of the specification, are to be read in conjunction therewith, and like reference numerals are employed to designate identical components in the various views.

DESCRIPTION OF THE PREFERRED EMBODIMENT

Figure 1:
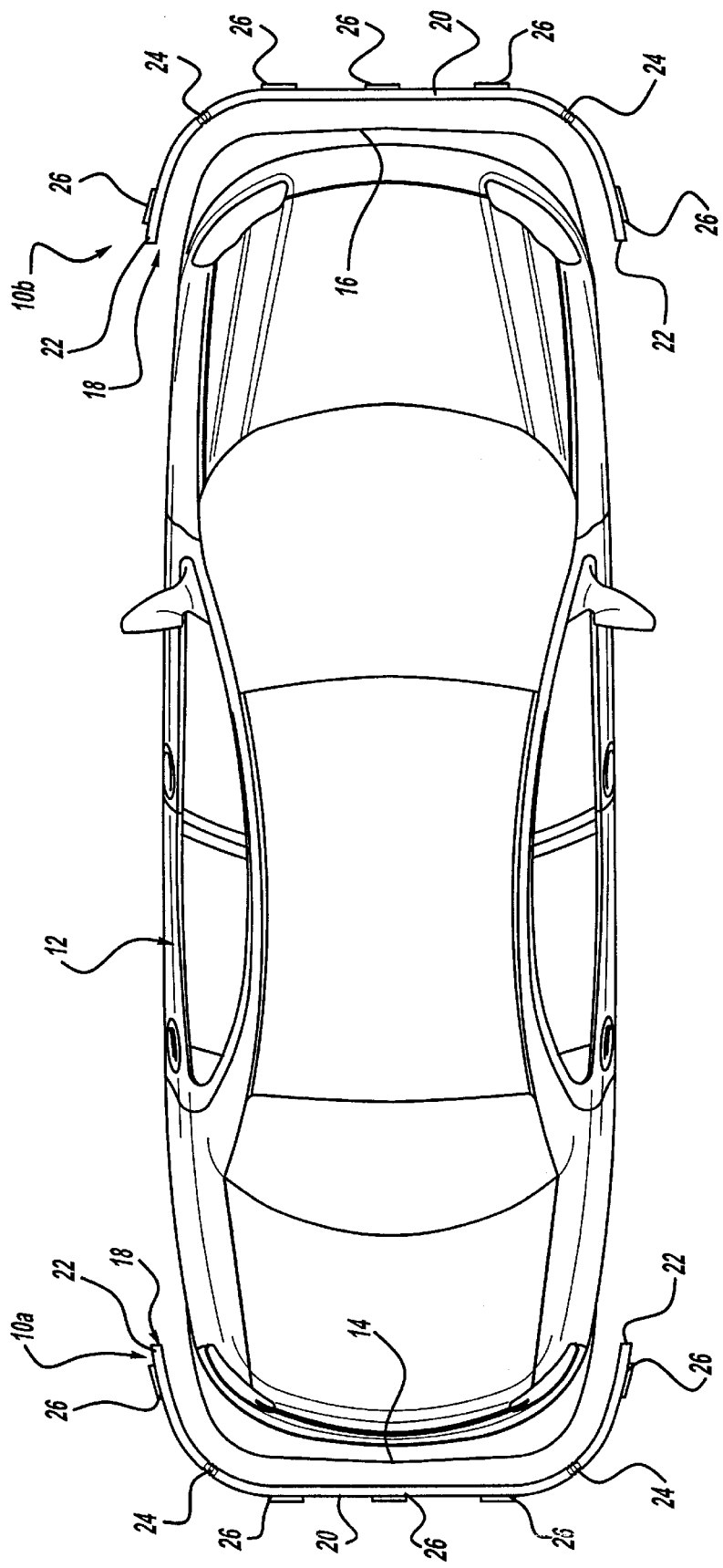
FIG. 1 is a plan view of a vehicle having sensor carrier assemblies arranged in accordance with the principles of the present invention.
Figure 2:
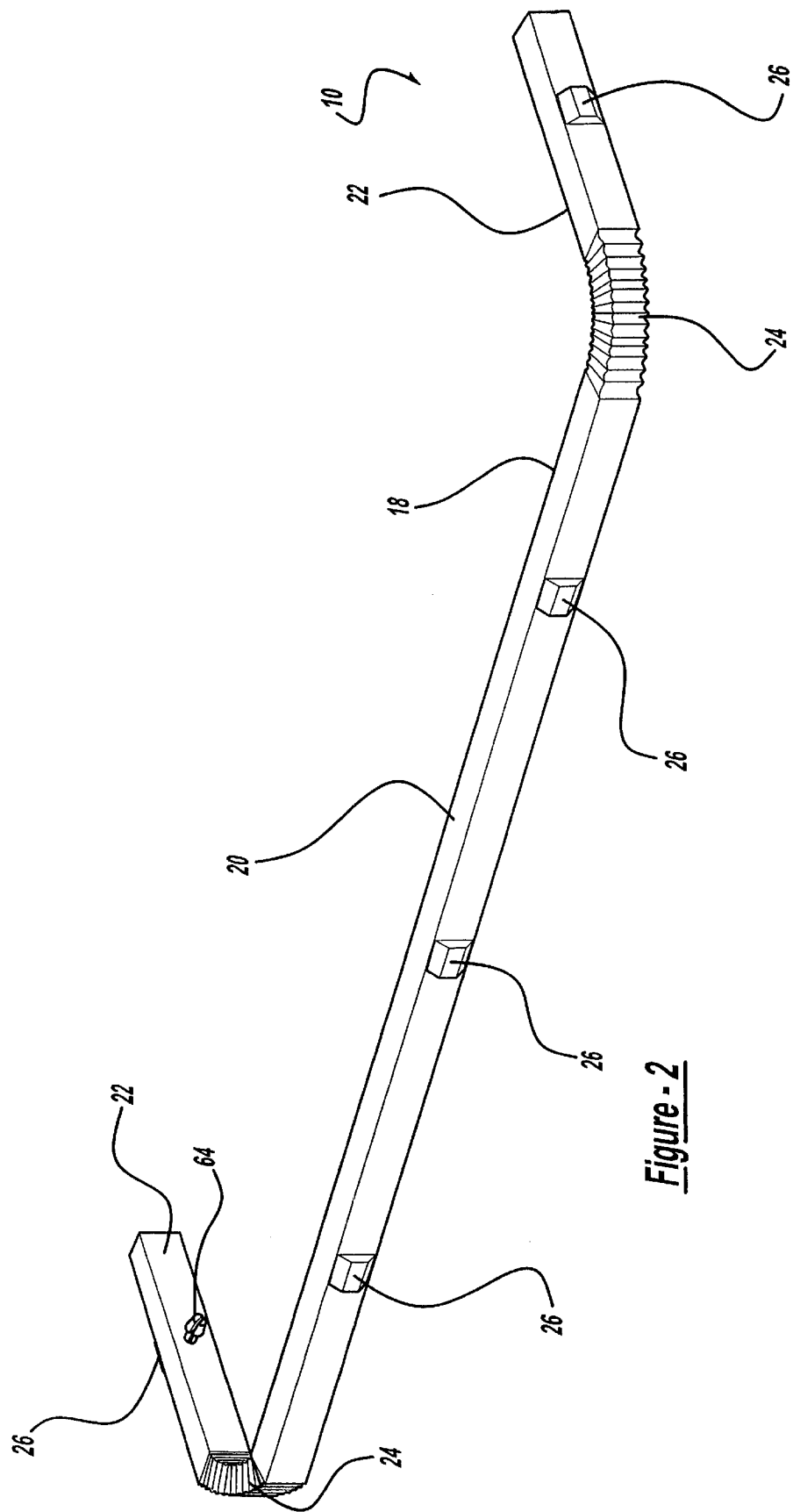
FIG. 2 is a perspective view of a sensor carrier assembly.

With reference to the figures, FIGS. 1 and 2 depict a sensor carrier assembly 10, with reference numeral 10*a* referring to a rear sensor carrier assembly and reference numeral 10*b* referring to a front carrier sensor assembly. Sensor carrier assemblies 10*a*, 10*b* will generally be referred to as sensor carrier assembly 10. Sensor carrier assembly 10 mounts to a vehicle 12 having a rear end 14 and a front end 16. It should be noted that FIG. 1 generally shows a plan view directed to generally teaching a vehicle including a sensor carrier assembly 10 which may be mounted to the front or rear ends of the vehicle. One skilled in the art will recognize that sensor assemblies can be mounted to the sides or portions of the sides and ends of the vehicle. Further, as will be described herein, sensor carrier assembly 10 may be mounted in various ways to maintain a decorative appearance of the vehicle.

Each sensor carrier assembly 10 includes a carrier 18. Carrier 18 as shown in FIGS. 1 and 2 includes a central section 20 and end sections 22. Carrier 18 generally defines an elongated member comprising the sections 20 and 22. The sections are interconnected by a hinge 24, such as a living hinge, which enables end sections 22 to fold with respect to central section 20. Hinges 24 thus facilitate attaching sensor carrier assembly 10 to vehicle 12, particularly in areas where sensor carrier assembly 10 desirably wraps around a curved section of vehicle 12. Hinges 24 also facilitate shipment of sensor carrier assembly 10 by enabling sensor carrier assembly 10 to assume a more compact configuration for shipping by folding end sections 22 inward toward central section 20.

Carrier 18 supports one or a plurality of sensors 26. Sensors 26 will be described herein with respect to a radar-based collision avoidance system, and will generally be described as radar sensors. More particularly, sensors 26 generally define a radar transmitter/receiver pair integral in a single sensor assembly. Thus, each sensor transmits a radar signal and detects the returned radar signal upon reflection from an object within view of that particular sensor. Alternatively, one or a plurality of sensors 26 transmit a radar signal, and the other sensors of the plurality detect the returned radar signal reflected back from an object within the view of those particular radar sensors. While one skilled in the art will recognize that sensors 26 are described herein as radar sensors, alternate sensor embodiments as such infrared (IR) and acoustical or sound-based sensors may be similarly configured.

Sensors 26 are preferably arranged to cover a predetermined zone with respect to the vehicle. For example, the sensors 26 arranged on carrier assembly 10a at rear end 14 of vehicle 12 cover various areas around the vehicle not fully viewable using vehicle interior and exterior mirrors. Thus, the radar system implemented by sensors 26 on sensor carrier assembly 10a covers vehicle blind spots. Sensor carrier assembly 10b on the other hand, may be used particularly to implement a collision avoidance system which detects oncoming vehicles or objects within a predetermined field of view. Thus, sensors 26 of sensor carrier assembly 10b, while not covering blind spots, assists the driver in detecting oncoming objects with which vehicle 12 could collide.

Figure 3:
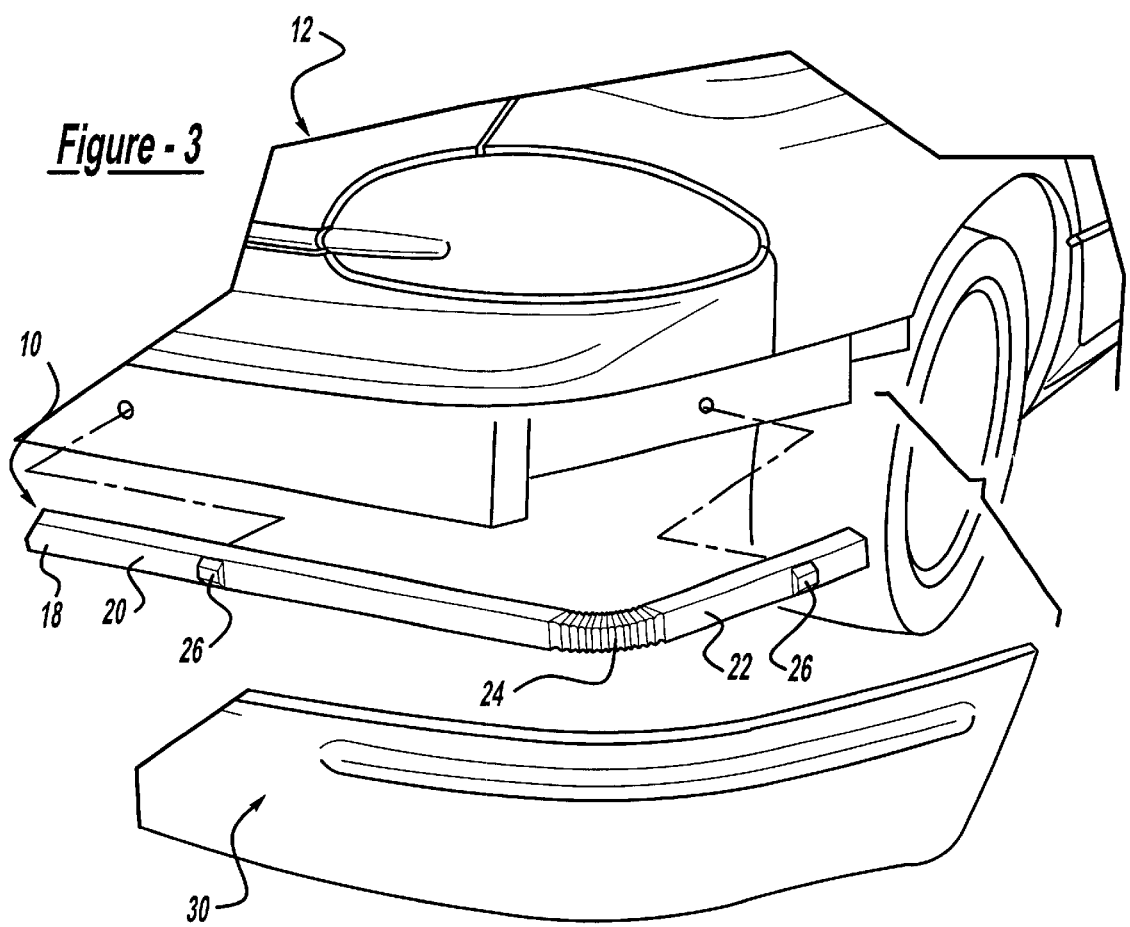
FIG. 3 is a perspective view showing a sensor carrier mounted to the vehicle beneath the bumper.
Figure 4:
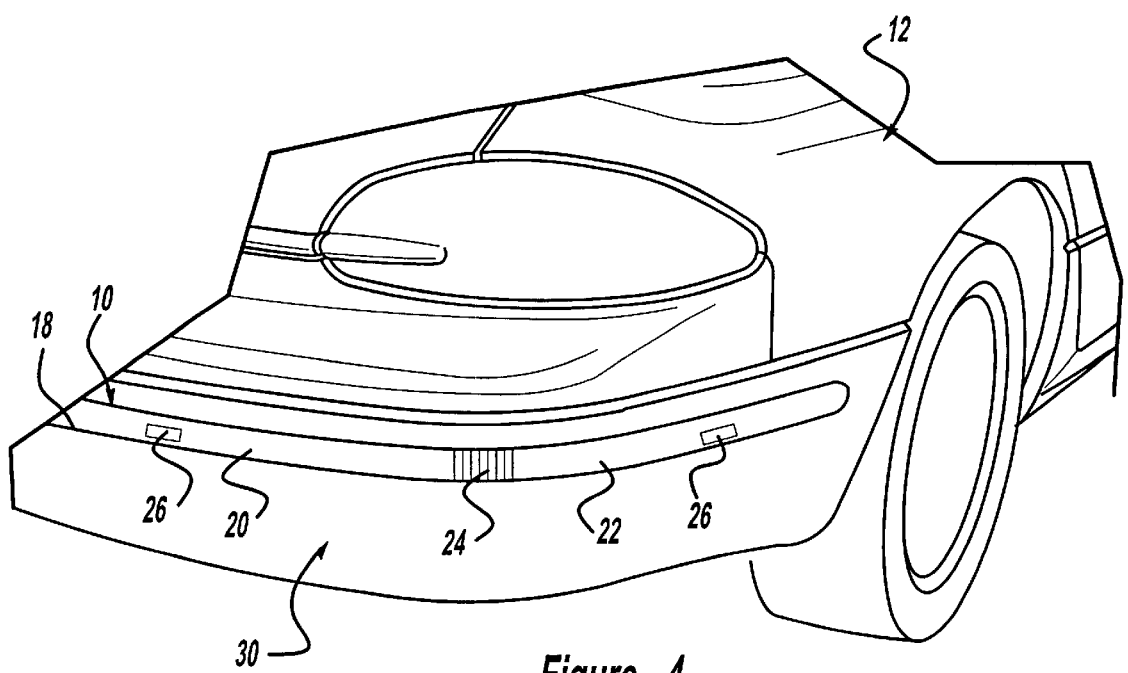
FIG. 4 is a perspective view showing a sensor carrier assembly mounted to the exterior of a vehicle bumper.

FIGS. 3 and 4 depict alternate configurations for mounting sensor carrier assembly 10 to vehicle 12. FIG. 3 depicts a first configuration in which sensor carrier assembly 10 mounts directly to vehicle 12. A bumper assembly 30 then attaches to vehicle 12 so as to cover sensor carrier assembly 10. In this configuration, sensors 26 preferably transmit and receive through the plastic or other material of bumper assembly 30. This configuration provides the preferred radar coverage while leaving the decorative appearance of the vehicle undisturbed, as bumper assembly 30 covers sensor carrier assembly 10.

FIG. 4 depicts an alternative configuration for mounting sensor carrier assembly 10 to vehicle 12. In FIG. 4, bumper assembly 30 is mounted directly to vehicle 12, and sensor carrier assembly 10 mounts to bumper assembly 30. In the configuration of FIG. 4, sensor carrier assembly 10 preferably maintains a suitable decorative appearance by appearing as a plastic molding or trim strip mounted to bumper assembly 30.

Figure 5:
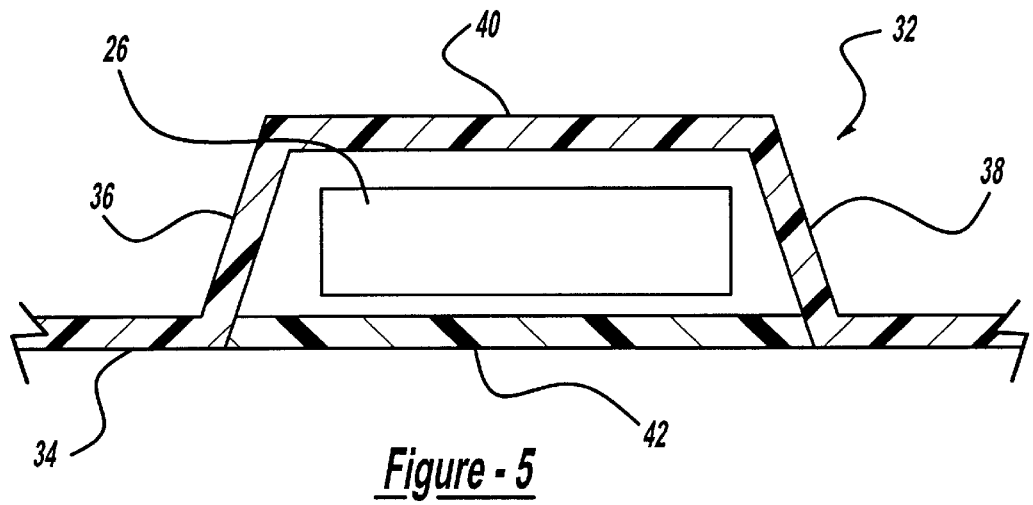
FIG. 5. is a horizontal sectional view showing a first configuration for attaching a sensor to the carrier.
Figure 6:
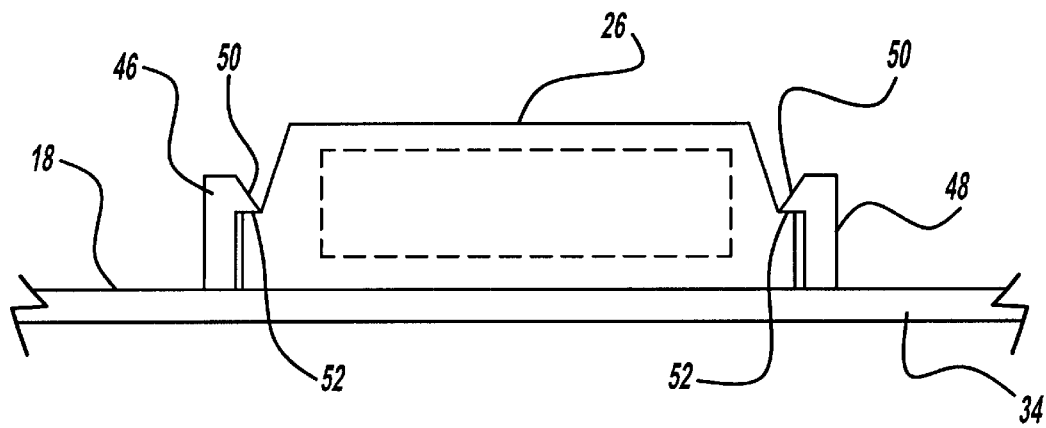
FIG. 6 is a horizontal sectional view of a second configuration for attaching a sensor to the carrier.

FIGS. 5 and 6 depict alternate configurations for attaching a sensor 26 to one of the respective central section 20 or end section 22. With reference to FIG. 5, a sensor 26 resides within a sealed compartment 32 formed in carrier 18. The area around sealed compartment 32 includes beam 34, first side wall 36, second side wall 38, third and fourth side walls (not shown), and end wall 40. A seal 42 is placed generally in line with beam 34 and between the side walls. Seal 42 provides an environmental seal for sensor 26. Seal 42 preferably is maintained through an interference fit, adhesives, or other means known to those skilled in the art. Electrical conductors (not shown) exit from sealed compartment 32 while maintaining an environmental seal.

FIG. 6 depicts a second configuration for mounting sensor 26 to carrier 18. Carrier 18 includes a beam 34, as described above in FIG. 5. A pair of clips 46, 48, project outwardly from beam 34. Clips 46, 48 include hooks 50 which define a notch that engages a step 52 formed along the side wall of the exterior packaging of sensor 26. Clips 46, 48 preferably bend away from each other. Upon insertion, steps 52 on the side walls of sensor 26 push clips 46, 48 away from each other so that steps 52 can engage the notches formed by hooks 50.

Figure 7:
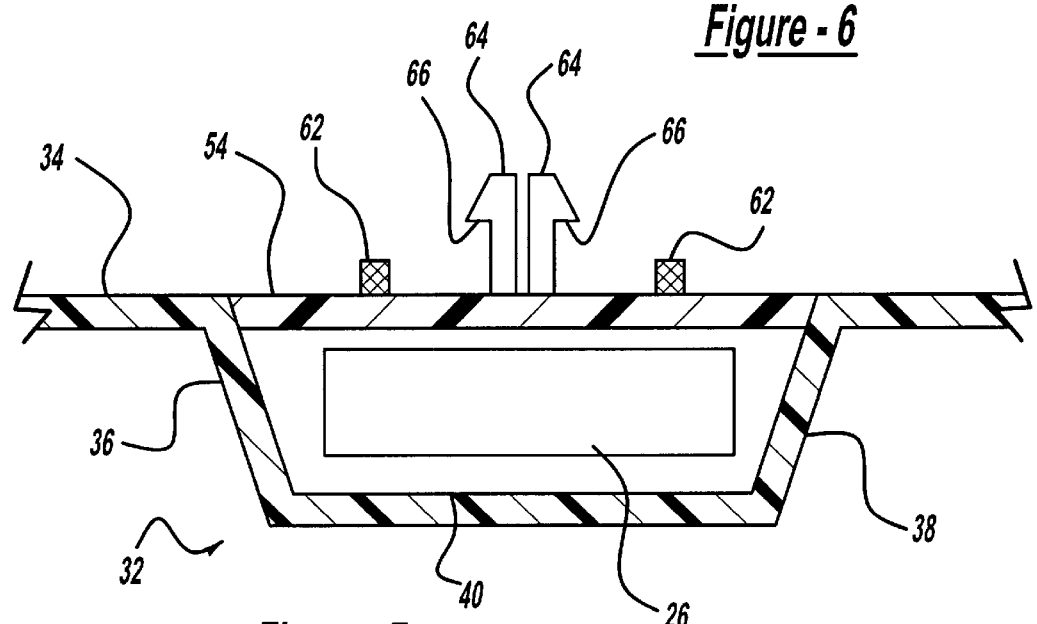
FIG. 7 is a horizontal sectional view showing a first fastener configuration for attaching the carrier to the vehicle.
Figure 8:
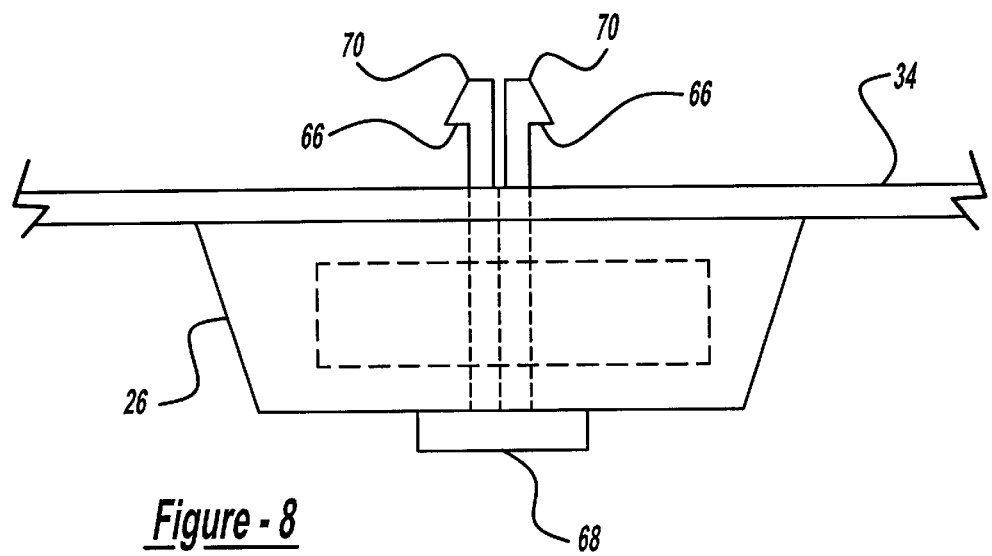
FIG. 8 is a horizontal sectional view showing a second fastener configuration for attaching the carrier to the vehicle.

Another feature of the present invention can be found with respect to attachment the carrier 18 to the vehicle 12. In particular, carrier 18 attaches to vehicle 12 by fasteners which preferably are disposed in proximity to sensors 26 in order to better align the sensor with respect to the vehicle. Such alignment can be critical when radar sensors have a defined sweep angle, and the sensor must be properly aligned to properly cover the desired blind spot. FIGS. 7 and 8 depict two separate approaches to fasten the carrier 18 to the vehicle 12.

With respect to FIG. 7, FIG. 7 depicts a sealed compartment 32, similar to that discussed in FIG. 5. Sealed compartment 32 has side walls 36, 38, two other side wall (not shown), and end wall 40. The side walls and end wall 40 cooperate with seal 54 to provide an environmental seal for sensor 26. Seal 54 is generally aligned with beam 34 to provide an environmental seal for sensor 26. Seal 54 includes a pair of alignment pins 62 which align with corresponding holes or apertures (not shown) on vehicle 12 or bumper assembly 30, depending upon to which component carrier 18 attaches. Disposed between alignment pins 62 are a pair of clips 64 which cooperate to define a tree clip. Clips 64 include a lip 66 which engages a surface in proximity to an aperture in which clips 64 are inserted. Such a configuration fastens carrier 18 to one of vehicle 12 or bumper assembly 30 as described above.

FIG. 8 depicts a second fastening configuration for attaching sensor carrier assembly 10 to one of a vehicle 12 or bumper assembly 30. As shown in FIG. 8, sensor 26 attaches to beam 34 by a fastener 68. Fastener 68 preferably passes through sensor 26 or in proximity to sensor 26 thereby attaching sensor 26 to beam 34. Fastener 68 also passes through beam 34 and includes a pair of clips 70 which pass through beam 34 and enable attachment to one of vehicle 12 or bumper assembly 30. The clips 70 include a lip 66 and cooperate to form a tree clip which engages a surface adjacent to an aperture in which the clips 70 are inserted on the vehicle 12 or bumper assembly 30.

Figure 9:
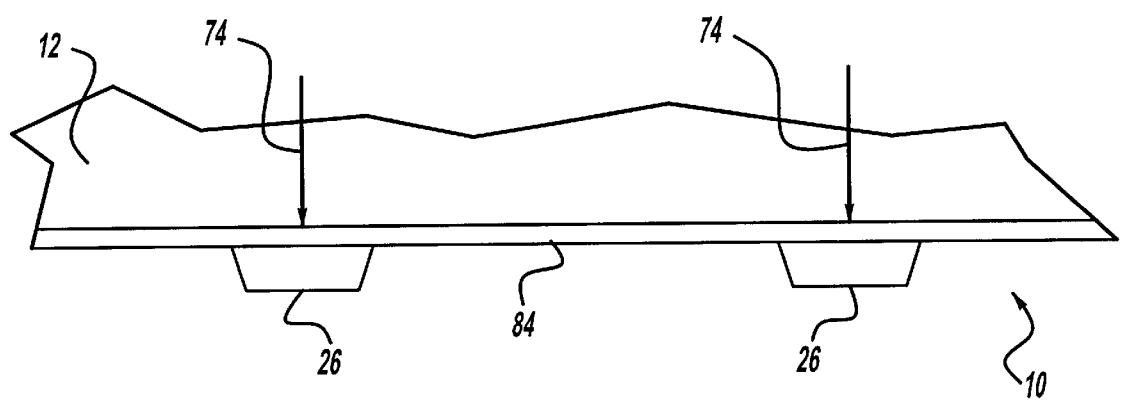
FIG. 9 is a horizontal sectional view of the car and carrier interconnection showing the position of the fasteners relative to the sensors.

FIG. 9 depicts a particular configuration of fastener placement for mounting sensor carrier assembly 10 to the vehicle 12, either directly or to a bumper assembly. In particular, a pair of sensors 26 attach to beam 34 by any of the attaching arrangements discussed above. Fasteners 74 attach sensor carrier assembly 10 to vehicle 12. Fasteners 74 may embody any configuration of the fasteners described herein. Fasteners 74 are placed in close proximity to sensors 26 to ensure alignment of the sensors with respect to vehicle 12 and to ensure attachment of the sensors to a hard point on the vehicle.

Figure 10:
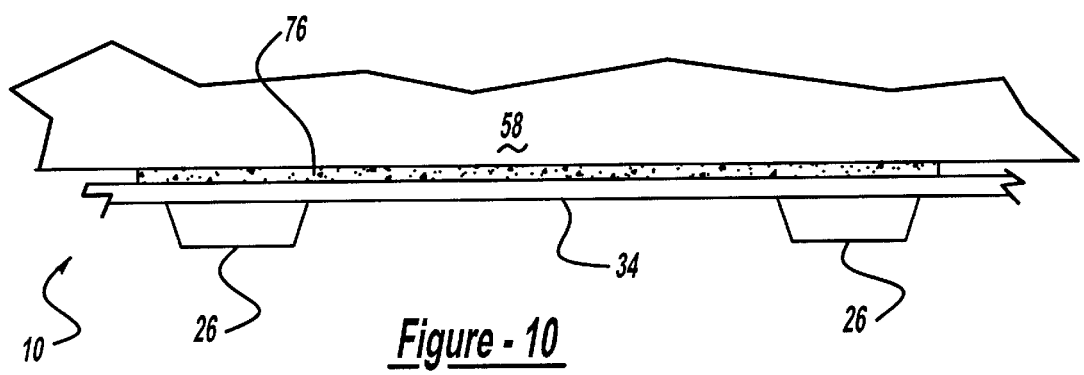
FIG. 10 is a horizontal sectional view showing material inserted between the car and the carrier to reduce noise and vibration.

FIG. 10 depicts a sensor carrier assembly 10 including a pair of sensors 26 mounted to a beam 34 of carrier 18. Beam 34 of carrier 18 attaches to vehicle 12. In a particular feature of the present invention of FIG. 10, a layer of generally soft material 76, such as foam having a pressure sensitive adhesive, can be placed between beam 34 and mounting substrate 58, which can be any of vehicle 12 or bumper assembly 30, depending upon the preferred mounting method for the particular application. Soft material 76 reduces rubbing, noise, and vibration which might be otherwise generated at the interconnection between sensor carrier assembly 10 and mounting substrate 58.

Figure 11:
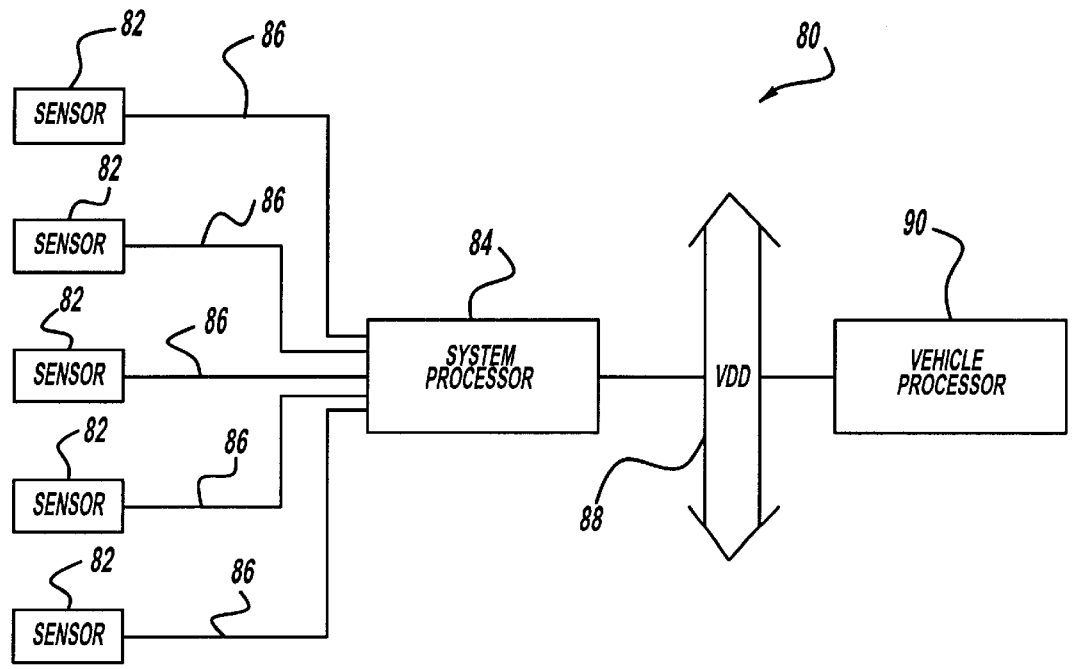
FIG. 11 is a block diagram of a sensor control system.

FIG. 11 depicts a block diagram for a sensor processing system 80, such as a collision avoidance system. Sensor processing system 80 includes a plurality of sensors 82, which may operate as described with respect to sensors 26. Sensors 82 connect to a system processor 84 via electrical conductors 86. Electrical conductors 86 transmit electrical signals between sensors 82 and system processor 84 so that system processor 84 can cause sensor 82 to transmit a signal and/or can receive signals output by sensors 82 in response to detection of the sensed perameter.

System processor 84 processes the collective information generated by sensors 82 and outputs a control information signal to a vehicle data bus (VDB) 88. VDB 88 interconnects one or a plurality of processors, such as system processor 84 and vehicle processor 90. Vehicle processor 90 interprets information output on vehicle data bus 88 by system processor 84 and generates control signals.

In the case of a collision avoidance system, one or a plurality of sensors 82 may either or both transmit and receive radar signals in accordance with control commands from system processor 84. System processor 84 then interprets the reflected signals and generates an output signal on vehicle data bus 88, which may indicate a possible collision situation. Vehicle processor 90 interprets the output signal supplied to VDB 88 by system processor 84 and generates corresponding control commands to various visual or audible indicators (not shown) or other vehicle control systems (not shown) to warn the driver of a possible collision. One skilled in the art will recognize that sensor carrier assembly 10 may include system processor 84. In doing so, system processor 84 mounts to sensor carrier assembly 10 so that sensor carrier assembly 10 may be marketed as a complete system for assembly to the vehicle followed by electrical connection.

Figure 12:
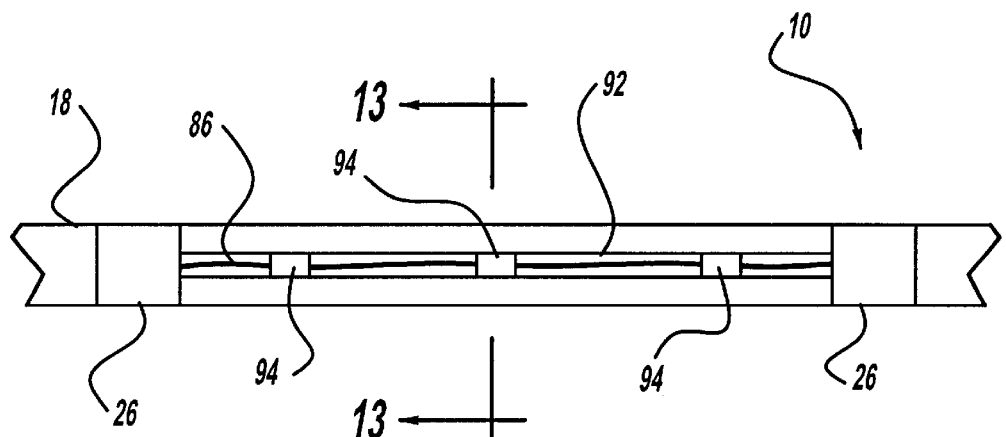
FIG. 12 is a partial view of the sensor assembly showing wires mounted to the carrier assembly for interconnecting the sensors.
Figure 13:
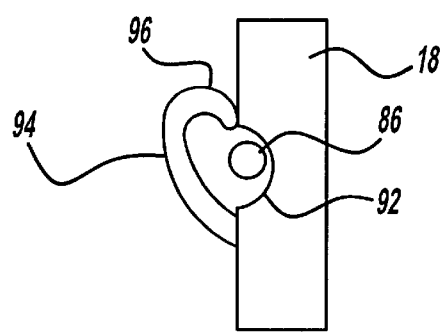
FIG. 13 is a cross sectional view along the lines of 13—13 showing the carrier supporting an electrical conductor interconnecting electrical components supported by the carrier.

As discussed above, electrical conductors 86 interconnect sensors 82 to system processor 84. In some applications, electrical conductors 86 also interconnect sensors 82. Sensor carrier assembly 10 provides an additional feature by providing grooves or clips for routing electrical conductors within sensor carrier assembly 10. FIGS. 12 and 13 depict a portion of sensor carrier assembly 10. A pair of sensors 26 mount to carrier 18 are interconnected by electrical conductors 86. A groove 92, or a plurality of grooves, formed on carrier 18 receive electrical conductors 86. Further, one or a plurality of clips 94 assist in maintaining electrical conductors 86 securely to carrier 18. As shown in FIG. 13, clip 94 is formed in a general hook shape resiliently formed to press against carrier 18. Electrical conductors 86 pass between end portion 96 of clip 94 and carrier 18 for placement within groove 92. In some applications, groove 92 may be unnecessary, as clips 94 may suitable perform their retention function.

While sensor carrier assembly 10 described with respect to FIGS. 1–13 suitably provides a sensor carrier assembly for convenient installation and utilization on a vehicle, additional considerations exist for accommodating a vehicle attached to and towing a trailer. When a trailer is towed behind a vehicle, the collision avoidance sensors would undesirably detect the trailer in tow behind the vehicle. The trailer would constantly set off the collision avoidance alarms, possibly prompting the driver to disable the collision avoidance system. In yet an additional feature of the present invention, FIGS. 14 and 15 depict a collision avoidance system adapted to utilization with a trailer.

Figure 14:
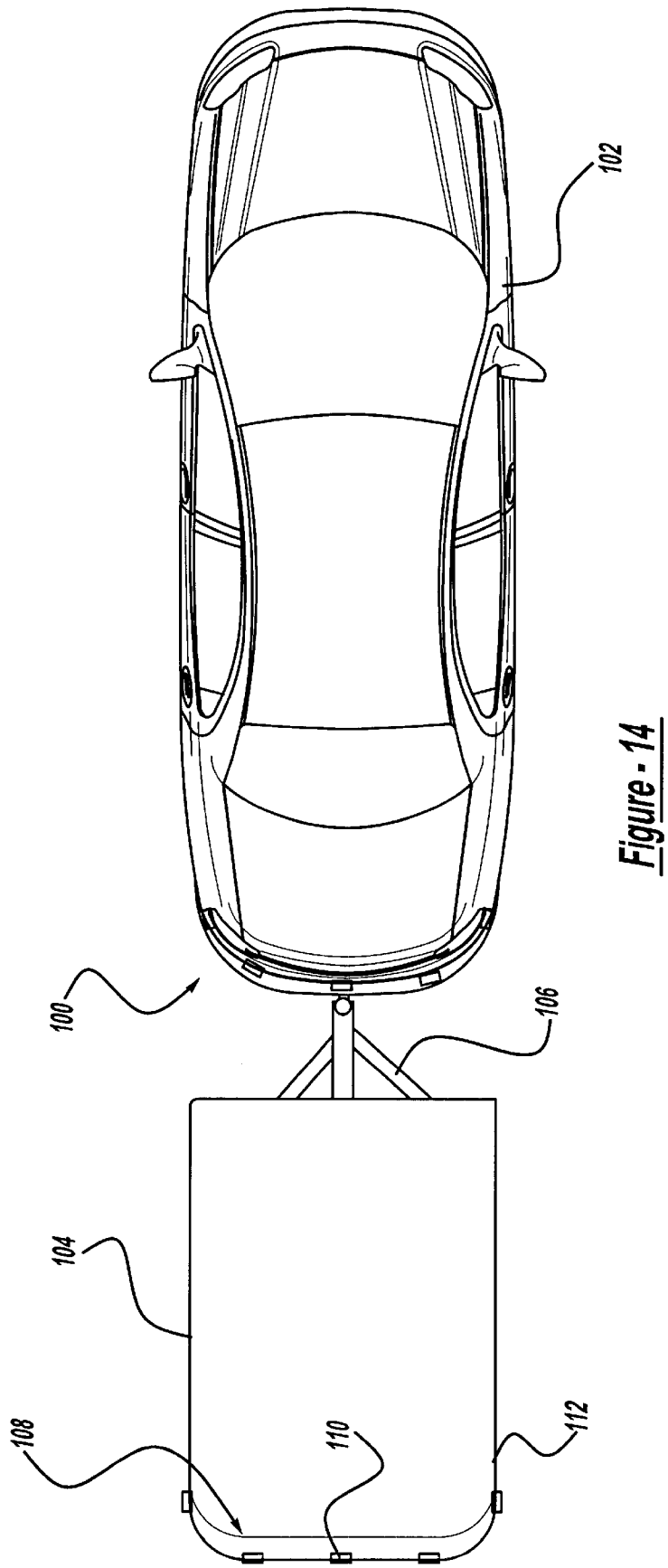
FIG. 14 is a plan view of a vehicle and trailer caravan having a sensor carrier assembly in each of the vehicle and trailer.

FIG. 14 depicts a vehicle 102 having a sensor carrier assembly 100 generally arranged as described above with respect to FIGS. 1–13. Vehicle 102 is adapted to tow a trailer 104 arranged behind and attached to vehicle 102. A trailer hitch assembly 106 interconnects vehicle 102 with trailer 104. Trailer hitch assembly 106 may be arranged in any of number of hitch configurations well known to those skilled in the art. Trailer 104 includes a trailer sensor carrier assembly 108. Trailer sensor carrier assembly 108 interconnects to trailer 104 to provide a plurality of sensors toward the rear end 110 and sides 112 of trailer 104. Trailer sensor carrier assembly 108 is generally configured as described above with respect to sensor carrier assembly 10 in FIGS. 1–13. In particular, trailer sensor carrier assembly 108 supports one or a plurality of sensors as described above and connects to trailer 104 either internally or externally to a bumper portion of trailer 104.

In operation, when trailer 104 is connected to vehicle 102, preferably the collision avoidance sensors attached to the rear end of vehicle 102 are interpreted to account for the presence of trailer 104 in favor of utilizing signals provided by collision avoidance sensors on trailer sensor carrier assembly 108. FIG. 15 depicts a block diagram of an interconnect lockout circuit for selecting between one of trailer sensors or vehicle sensors for input to a system processor, as described in FIG. 11.

Figure 15:
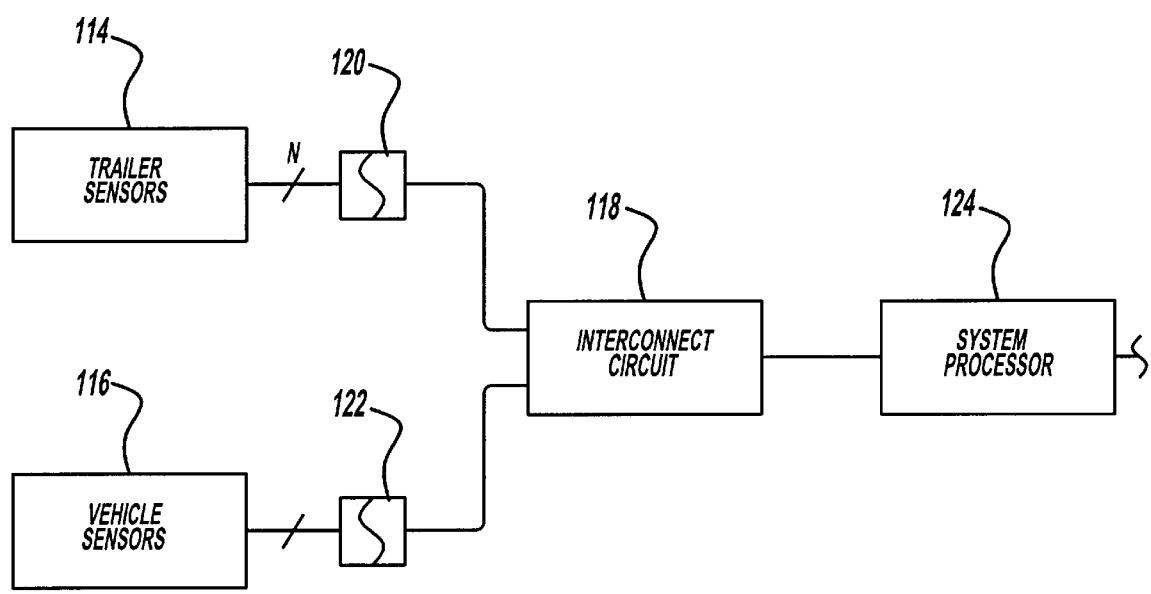
FIG. 15 is a block diagram of an interconnect lockout circuit for the system of FIG. 14.

In FIG. 15, one or a plurality of trailer sensors 114 correspond to sensors arranged on trailer sensor carrier assembly 108. One or a plurality of vehicle sensors 116 correspond to collision avoidance sensors arranged on sensor carrier assembly 100 of vehicle 102. Trailer sensors 114 output one or a plurality of electrical signals to interconnect circuit 118. Similarly, vehicle sensors 116 output one or a plurality of signals to interconnect circuit 118. A connector 120 facilitates interconnection between trailer sensors 114 and 118. Similarly, a connector 122 facilitates interconnection between vehicle sensors 116 and interconnect circuit 118.

Interconnect circuit 118 preferably detects whether trailer sensors 114 are placed within the system by connection through connector 120. If so, interconnect circuit 118 disables or ignores portions of the input received from vehicle sensors 116 in favor of alternate input received from trailer sensors 114. Interconnect circuit 118 then outputs one or a plurality of signals to system processor 124. System processor 124 operates as described above with respect to system processor 84 of FIG. 11. Once interconnect circuit 118 has signals or portions of signals selected for input to system processor 124, operation proceeds as described above. In this manner, by simply introducing trailer sensors 114 into the system, proper collision avoidance can occur.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. A sensor assembly for a vehicle comprising:
   a plurality of sensors for operation of a radar system, each sensor including at least one of a transmitter for generating a radar signal and a receiver for detecting the radar signal upon reflection from an object;

a carrier having an elongate shape and formed in sections, each section interconnected by a hinge, each of the plurality of sensors being mounted to the carrier, wherein the carrier is operable to be mounted to the vehicle to orient the sensors in a predetermined position on the vehicle, wherein the carrier mounts to an end of the vehicle and wherein the carrier either mounts to the bumper or mounts to the vehicle and is covered by the bumper;

fasteners for attaching the carrier to the vehicle, said fasteners disposed in proximity to each sensor to maintain a predetermined alignment and orientation of each sensor with respect to the vehicle, wherein a fastener is positioned directly behind a sensor when the carrier is mounted to the vehicle, wherein the fasteners further comprise one of a clip or a threaded fastener to secure the carrier to the vehicle; and a processor receiving signals from the plurality of sensors and determining if an object is in proximity to the vehicle.

2. The assembly of claim 1 wherein the carrier further comprises a wire holder for supporting wires connected to sensors.

3. The assembly of claim 2 wherein the wire holder comprises one of clips or grooves supported by the carrier.

4. A sensor assembly for a vehicle comprising:

a plurality of sensors for operation of a radar system, each sensor including at least one of a transmitter for generating a radar signal and a receiver for detecting the radar signal upon reflection from an object;

a carrier having an elongate shape and formed in sections, each section interconnected by a hinge;

a plurality of recesses formed in the carrier, the recesses receiving one or a number of each of the plurality of sensors to attach the sensors to the carrier, wherein the carrier is operable to be mounted to the vehicle to orient the sensors in a predetermined position on the vehicle;

a fastener mounted in proximity to the sensor for maintaining a predetermined orientation of the sensor, wherein the fastener is positioned directly behind the sensor when the carrier is mounted to the vehicle, wherein the fastener further comprises one of a clip or a threaded fastener to secure the carrier to the vehicle; and a processor receiving signals from the plurality of sensors and determining if an object is in proximity to the vehicle.

5. The assembly of claim 4 wherein the recesses are sealed to protect the plurality of components received therein.

6. The assembly of claim 4 wherein the carrier further comprises a wire holder for supporting wires interconnecting the respective sensors.

7. The assembly of claim 6 wherein the wire holder comprises one of clips or grooves supported by the carrier.

8. The assembly of claim 7 further comprising a resilient material disposed between the carrier and the vehicle, the resilient material reducing vibration between the carrier and the vehicle.

9. A sensor assembly system comprising:

a first vehicle;

a first plurality of sensors;

a first carrier, each of the first plurality of sensors being mounted to the first carrier, wherein the first carrier is mounted to the first vehicle to orient the first plurality of sensors in a predetermined position on the vehicle;

a second vehicle, the second vehicle being attached to and towed behind the first vehicle;

a second plurality of sensors;

a second carrier, each of the second plurality of sensors being mounted to the second carrier, wherein the second carrier is mounted to the second vehicle to orient the second plurality of sensors in a predeted position on the vehicle; and an interconnect circuit which senses the presence or absence of the connection of the second plurality of sensors and selectively disabling at least one of said first plurality of sensors when said second plurality of sensors are connected.

10. The sensor assembly system of claim 9 further comprising an interconnect circuit, the interconnect circuit receiving input from each of the first and second plurality of sensor, the interconnect circuit selecting for output all or a portion of the input from one of the first and second plurality of sensors.

11. The sensor assembly system of claim 10 wherein when the interconnect circuit detects input from the second plurality of sensors, the interconnect circuit selects the output from all or a portion of the input from the second plurality of sensors and a portion of or none of the input from the first plurality of sensors.

12. The sensor assembly system of claim 10 wherein when the interconnect switch detects input from only the first plurality of sensors, the interconnect switch selects the output from the input from the first plurality of sensors.

13. The sensor assembly system of claim 9 wherein the first and second plurality of sensors comprise sensors for a radar system.

14. The sensor assembly system of claim 13 wherein at least one sensor of the first and second plurality of sensors for the radar system further comprises at least one of a transmitter for generating a radar signal and a receiver for detecting the radar signal upon reflection from an object.

* * * * *

UNITED STATES PATENT AND TRADEMARK OFFICE
CERTIFICATE OF CORRECTION

PATENT NO.   : 6,508,325 B1
DATED        : January 21, 2003
INVENTOR(S)  : Paul M. Schwartz et al.

It is certified that error appears in the above-identified patent and that said Letters Patent is hereby corrected as shown below:

Column 3,
Line 19, "as such " should be -- such as --.

Column 8,
Line 20 "predeted" should be -- predetermined --.

Signed and Sealed this

Twenty-seventh Day of July, 2004

JON W. DUDAS
*Acting Director of the United States Patent and Trademark Office*